Patented Nov. 8, 1932

1,887,256

UNITED STATES PATENT OFFICE

CAREY K. BIZZELL, OF ELIZABETH, NEW JERSEY, AND JAMES EUSTACE BIZZELL, OF BROOKLYN, NEW YORK

PROCESS FOR TREATING EDIBLE NUTS

No Drawing. Application filed March 15, 1932. Serial No. 599,060.

This invention relates to an improved composition and process for treating nuts having adherent skins, such as Brazil nuts, filberts, almonds and the like.

Hitherto, it has been proposed to separate nut meats from adherent skins and shells, by using superheated steam.

In the case of Brazil nuts and like natural products, undesirable alteration of the nut kernel and the flavors of the products therein has been experienced, when subjected to such treatments. This is probably due to the cooking of the meats and the conversion of the oils.

It is an object of this invention to provide an improved process for removing adherent skin from Brazil nuts, filberts, almonds and other natural products.

It is a further object of this invention to provide such an improved process in which the natural flavor and texture of the nuts are retained.

Yet another object of this invention is the provision of an improved process for the removal of adherent skin from nuts and like products by saponifying subcutaneous ingredients of the nuts.

A further object of this invention is the provision of an improved process of removing skins from Brazil nuts and the like, which includes impregnating the skins with a saponifiable material and thereafter saponifying the material and removing the skin and associated soap.

Yet another object of this invention is the provision of such an improved process in which the saponification step is carried out without added saponifiable matter.

Among the other objects and advantages of this invention are the provision of improved reagents for saponifying nut surfaces and increasing the speed of this saponification, as well as improvements in after treatment of treated nuts to neutralize or to neutralize and blanch same.

These and other desirable objects and advantages of the present invention will be described in the accompanying specification, certain preferred compositions and modes of operation being set forth by way of example only, for, since the underlying concepts of the present invention may be embodied in other specific processes and modes of operation, it is not intended to be limited to the ones herein set forth and described, except as such limitations are clearly imposed by the appended claims.

Briefly considered, the improved process of the present invention comprehends a novel treatment for the purpose of removing the skins from Brazil nuts, filberts, almonds and like products. For the purpose of a definite example this invention will be defined in general and in detail as pertaining to Brazil nuts. As is well known, Brazil nuts are characterized by having a highly adherent skin of fibrous material, which approximates a woody texture, as opposed to the purely cellulosic materials met with in fruits. In the treatment of fruits having more or less purely cellulosic coverings, hydrolysis may be readily effected with concentrated lyes.

In the practice of the present invention the shelled nuts are passed through a heated solution comprising, by way of example only, six ounces of sodium carbonate to a gallon of water, which solution has been brought to and held at the boiling point. The nuts are allowed to remain in this heated solution for a few minutes, depending upon the specific variety of nut, and the dryness and thickness of the skin which is to be removed. From one to seven minutes has been found to be a satisfactory period of time for this treatment. The concentration may vary depending upon the nuts being treated. Filberts and almonds require less treatment than Brazil nuts, and more dilute solutions can therefore be used.

After the nuts have been exposed to the saponifying action of the boiling solution for the desired period of time they are removed from the liquid. The treated nuts are then immediately subjected to a stream of water under pressure, usually 50 to 80 pounds nozzle pressure, for a sufficient length of time to cause the removal of the skins and associated saponified matters.

The water used for this pressure washing and removal of the treated skins is preferably maintained at 160–200° F., although this heating feature is not strictly necessary. After the nuts have been skinned in the manner above outlined they are then placed in a weak warm solution of acetic acid or citric acid. The function of this acid is to neutralize any alkalis absorbed or retained by the surface of the nut meats or kernels. The washed and neutralized nut meats or kernels are then removed and washed in clear water, and without pressure. The washed nuts are thereafter dried.

Where it is desired to work the process cold, it will be appreciated that a longer period of time will usually be required, but the desirable results will be obtained as in the use of the hot process.

The mechanism of the process above set forth is not fully known but are considered to involve the wetting or penetration of the skin and its hydrolysis to an extent by the solution, together with the saponification of the fatty acids of the nut oils at or in the surface layers of the kernels. The saponification results in the formation of soaps underneath and in the skin, disrupting and partly solubilizing the latter, either alone or in conjunction with any excess reagent present. While this postulate has not been definitely established, it is considered tenable in view of the separate use of fatty acids, as will be described more in detail hereinafter.

The desirable skin-solubilizing and saponifying effect of the compositions used may be further enhanced by the use of a reagent such as glycerine, which apparently has the function or capacity of more readily wetting the fibres of the skin material, as well as acting as a solvent for the soap formed and causing the latter to be quickly and uniformly distributed through the fibrous layers as fast as saponification is effected. The addition of one liquid ounce of glycerine to the composition above described, comprising six ounces of sodium carbonate to the gallon of water, the whole being maintained at the boiling point during the skinning of the nuts, has been found to increase the speed of saponification to such a point that the time required for such step is reduced by substantially one half.

As intimated hereinabove, still further desirable economies may be effected in the removal of adherent skins from nut kernels, if the nuts to be skinned are preliminarily impregnated or dipped in a liquid fatty acid for a few minutes to permit the fatty acid to impregnate the skin.

When nut kernels with their adherent skins or pericarps have been subjected to a preliminary impregnation or treatment with a fatty acid, it has been found that a saponification or treatment with the alkali carbonate or equivalent solution will require substantially one minute to secure the desired result as opposed to the one to seven minute period required where such a preliminary treatment was not provided. This marked increase in the rapidity of the reaction indicates that the presence of fatty acids in the skin material provides for a substantially immediate saponification by the caustic solution with the result that it is not necessary to wait a sufficient length of time to permit the causticized solution to penetrate the skin and react with the fatty materials at or in the surface portions of the nut kernels or meats proper.

As intimated hereinabove, any compound or mixture containing sodium, potassium or ammonia or any other suitable causticizing or saponifying agent may be used. Sodium carbonate has been specified as a preferred reagent and desirable results have been secured by using the corresponding hydrates of potash as well as the carbonates of the latter. Efficient results have been secured also by using alkaline earth hydrates, such as calcium hydrate. Magnesium hydrate has also been found to give a desirable result. The use of alkaline earth salts and magnesium salts, while giving a desirable result, do not permit of as rapid a removal of the reacted or converted pericarp and associated saponified materials as the soaps formed with alkaline earth compounds, such as those of calcium, and magnesium, are relatively insoluble and require greater pressure, with a certain degree of abrasion, to remove the skin and associated reacted surface materials. Zinc salts have also been found to react with fatty acids and are therefore suitable for use in the practice of the present invention.

In all of the modified treatments immediately set forth hereinabove the usual after treatments of subjecting the saponified nuts to pressure washing to remove the converted pericarp and associated soap are carried out. Thereafter, the skinned nuts are treated with a dilute acid, such as citric, hydrochloric, acetic, malic or phosphoric acid, alone or in suitable admixture in order to neutralize any reagent which may be adhered to the surface of the kernels and which have not been washed off in the pressure washing step. After this neutralizing step, the nut meats are washed in pure water, without pressure, to remove any excess of acid.

The neutralized nuts are then dried by exposure to a current of air which may have been dehydrated by passage through silica gel or activated carbon, or which may have been chilled to a point at which the contained moisture was frozen out. In addition, the air may desirably be heated and the heated air passed into contact with the nuts. In any event, it has been found that the washed nuts may be dried by passing dehydrated or heated air in contact with them and preferably under reduced pressure, if it is desired to maintain temperatures below a point at which the flavors of the nuts might be deleteriously affected by exposure to heat or they may be subjected to the action of steam and the pressure quickly released.

While certain fruit acids and the like have been specified as being particularly suited, in proper concentration, for neutralizing any alkali or equivalent substance retained on the nut meats, or kernels it has been found that the so treated nut meats may be appropriately neutralized and bleached in one and the same operation by using a relatively stronger acid. Thus, for example, after the nut kernels have had the reacted skin and associated soap materials washed off, they may be treated with a relatively weak solution of tartaric acid, which compound has the property not only of forming soluble tartrates, which may be readily washed off, but also of effecting a bleaching of the nut meats with a consequent improvement in the appearance thereof and without deleteriously affecting their desirable natural flavors.

While pressure washing with water has been described as an appropriate step for removing treated skin from the nuts, the invention also comprehends the use of a combination air and water blast or other suitable means for effecting the same desired result.

It will now be appreciated that there has been provided an improved method of removing the woody membrane from Brazil nuts and like materials, in which the materials under treatment are subjected to the solubilizing or hydrolyzing and saponifying action of a relatively weak solution maintained at its boiling temperature and for a short period of time varying from one to seven minutes or thereabouts, whereby the desired solubilizing and saponifying reactions are quickly effectuated without permitting the lapse of sufficient time for undesired side reactions to take place. The novel processes herein disclosed also comprehend the pre-treatment of the materials with fatty acids whereby to speed up the saponifying steps, and also include the use of catalytic materials, such as glycerine in the treating liquids.

The invention also comprehends the pressure washing of the reacted materials from the surface of the nuts and the neutralizing and blanching of the nuts by suitable acids, such as acetic, hydrochloric, citric and tartaric acids. To dry the so treated materials and remove all adsorbed or otherwise associated moisture, the use of dehydrated air and/or steam at suitable temperatures and pressures is set forth. The resulting products are characterized by a desirably blanched and clean appearance, freedom from stains and the retention of all desirable natural flavors in the nut meats.

While the foregoing description has been set forth in general and in detail in respect to specific ideas, it will be understood that changes and modifications may be made therein and that such changes and modifications are to be considered within the scope of the invention as defined in the subjoined claims.

What is claimed is:

1. In the process of removing skins from nut meats, the steps comprising preparing a hot aqueous solution of substantially 6 ounces per gallon of an alkaline reagent of the group comprising the carbonates, bicarbonates and hydroxides of sodium, potassium, ammonium, calcium, magnesium and the like, immersing the nut kernels in the said solution and for a time period of substantially one to seven minutes to permit reaction with the fatty materials of the skins but without permitting reaction upon the meat of the kernels, thereafter simultaneously removing the products of reaction and the skins, and neutralizing the so treated kernels by means of dilute acids of the group comprising acetic, malic, citric, tartaric, phosphoric, and hydrochloric acids.

2. In the process of removing skins from nut meats, the steps comprising preparing a hot aqueous solution of substantially 6 ounces per gallon of an alkaline reagent of the group comprising the carbonates, bicarbonates and hydroxides of sodium, potassium, ammonium, calcium, magnesium and the like, immersing the nut kernels in the said solution and for a time period of subtantially one to seven minutes to permit reaction with the fatty materials of the skins but without permitting reaction upon the meat of the kernels, thereafter pressure washing the kernels to simultaneously remove the products of reaction and the skins, and neutralizing the so treated kernels by means of dilute acids of the group comprising acetic, malic, citric, tartaric, phophoric, and hydrochloric acids.

3. In the process of removing skins from nut meats, the steps comprising preparing a hot aqueous solution of substantially 6 ounces per gallon of an alkaline reagent of the group comprising the carbonates, bicarbonates and hydroxides of sodium, potassium, ammonium, calcium, magnesium and the like, together with substantially one ounce of glycerine, immersing the nut kernels in the said solution and for a time period of substantially one to seven minutes to permit reaction with the fatty materials of the skins but without permitting reaction upon the meat of the kernels and thereafter simultaneously removing the products of reaction and the skins.

4. In the process of removing skins from nut meats, the steps comprising immersing the nut meats in a liquid fatty material whereby to impregnate the outer skins of the said nuts, removing the so treated nuts, preparing a hot aqueous solution of substantially 6 ounces per gallon of an alkaline reagent of the group comprising the carbonates, bicarbonates and hydroxides of sodium, potassium, ammonium, calcium, magnesium and the like, immersing the nut kernels in the said solution and for a time period of substantially one to seven minutes to permit reaction with the fatty materials but without permitting reaction upon the meat of the kernels and thereafter simultaneously removing the products of reaction and the skins.

In testimony whereof we have hereunto set our hands.

CAREY K. BIZZELL.
JAMES EUSTACE BIZZELL.